United States Patent
Chung et al.

(10) Patent No.: US 7,783,331 B2
(45) Date of Patent: *Aug. 24, 2010

(54) SLIDING MECHANISM AND PORTABLE ELECTRONIC DEVICE USING THE SAME

(75) Inventors: Huan-Chang Chung, Shindian (TW); Yu-Ming Chen, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 677 days.

This patent is subject to a terminal disclaimer.

(21) Appl. No.: 11/726,901

(22) Filed: Mar. 23, 2007

(65) Prior Publication Data

US 2008/0106856 A1      May 8, 2008

(30) Foreign Application Priority Data

Nov. 8, 2006     (CN) .................. 2006 1 0063527

(51) Int. Cl.
*H04M 1/00* (2006.01)
(52) U.S. Cl. ............ 455/575.1; 455/550.1; 379/428.01; 379/433.01
(58) Field of Classification Search ............... 455/575.1, 455/550.1; 379/330, 428.01, 433.01
See application file for complete search history.

(56) References Cited

U.S. PATENT DOCUMENTS 7,542,788 B2 *   6/2009   Lee ........................ 455/575.4
2005/0197173 A1*  9/2005   Wee et al. ................ 455/575.4
2006/0142073 A1*  6/2006   Gordecki .................. 455/575.4
2006/0180457 A1   8/2006   Ilan et al.
2007/0270180 A1* 11/2007   Takagi ...................... 455/550.1

FOREIGN PATENT DOCUMENTS

TW     M285728         1/2006
WO   2006/006776 A1    1/2006

* cited by examiner

*Primary Examiner*—Lester Kincaid
*Assistant Examiner*—Isaak R Jama
(74) *Attorney, Agent, or Firm*—Jeffrey T. Knapp (57) ABSTRACT

A sliding mechanism (100) for use in a portable electronic device (500) is provided. The sliding mechanism includes a first plate (10), a second plate (20), a plurality of limiting structure (17), and a linkage module (30). The second plate is longitudinally slidably connected with the first plate. The plurality of limiting structures is secured on the first plate for delimiting a position of the second plate with respect to the first plate. The linkage module is configured to approximate a collapsible hexagon and is disposed between and connects the first plate and the second plate. The linkage module further includes an elastic unit (34) that is able to semi-automatically drive the linkage module and enable the second plate to slide along the first plate, after the second plate is manually moved a predetermined length with respect to the first plate.

12 Claims, 5 Drawing Sheets

SLIDING MECHANISM AND PORTABLE ELECTRONIC DEVICE USING THE SAME

CROSS-REFERENCE TO RELATED APPLICATIONS

This application is related to a co-pending U.S. patent application Ser. No. 11/726,901 entitled "SLIDING MECHANISM AND PORTABLE ELECTRONIC DEVICE USING THE SAME" by Huan-Chang Chung. Such application has the same assignee as the instant application and has been concurrently filed herewith. The disclosure of the above-identified application is incorporated herein by reference.

BACKGROUND OF THE INVENTION

1. Field of the Invention

The present invention generally relates to sliding mechanisms and, more particularly, to a portable electronic device with two or more housings configured with a sliding mechanism such that one housing is allowed to slide with respect to another housing in a longitudinal direction.

2. Description of Related Art

Portable electronic devices have been increasingly widely used with a multiplicity of functions. A mobile telephone terminal is exemplified as a portable electronic device that provides wireless communication services to its subscriber while wirelessly communicating with its base station. Rapid development in the field of information and telecommunication business has made it possible for mobile users to use a variety of functions and types of mobile phones available on the market. These mobile telephone terminals are generally classified into three or more types of terminals, such as, e.g., a bar-type terminal, a flip-type terminal with a flip cover, and a foldable terminal with a folding mechanism adapted to be opened and closed about a main body at a given angle.

The bar-type terminal is generally formed with a single body housing so that various data input/output means and a receiver and transmitter set are arranged on the housing, and a keypad assembly utilized as a data input/output means is fully exposed. Thus, a bar-type terminal may suffer from error due to careless manipulation by its user, and its design requires a relatively long distance between the receiver set and the transmitter set, which may lead to serious limitations in making the terminal smaller.

The folding-type or foldable terminal generally incorporates a main body, a folding portion, and a hinge module for coupling the main body and the folding portion, so that rotation of the folding portion allows opening or closure of the folding portion with respect to the main body. The main body is provided with a data input/output means, such as, for example, a keypad and a receiver set. Thus, when the folding portion is in the closed state on the main body and the terminal is, effectively, in a standby mode, the terminal can prevent any undesired operation error or malfunction since the folding portion is adapted to fully cover the keypad. However, in a telephone mode, the folding portion is usually rotated away from the main body of the mobile phone to ensure that there is enough distance between the receiver and the transmitter of the phone. As a result of this ability to fold, the design of this type of terminal may be made much smaller, at least for storage purposes. As such, mobile users recently have preferred foldable terminals to any other type of mobile communication terminals.

When using flip-type or foldable terminals, the hinge module rotatably couples the flip member or the folding portion with the main body. The hinge module operates in such a manner that when the flip or folding portion of the mobile terminal is opened to rotate up to a specified threshold angle about the main body, a continuous acting force is generated by the hinge module and is applied in the direction of opening, without application of additional external force by a user. Meanwhile, when the flip or folding portion of the mobile terminal is rotated during closing below a specified threshold angle about the main body, a continuous acting force is generated by the hinge module and is applied in the direction of closure, without application of more force by the user.

In the meantime, as more diverse design concepts are introduced in the design of mobile communication terminals, a sliding type of mobile terminal has recently become widely used. The sliding-type design typically includes two housings in which one housing is slidably opened or closed with respect to the other housing. However, these sliding type mobile terminals do not yet offer a variety of different designs, and for this reason, its users may feel some inconvenience in that they have to manually slide one housing with respect to the other housing in order to open or close it.

What is needed, therefore, is a sliding mechanism for use in a portable electronic device (e.g., a mobile phone terminal) that can overcome the above-mentioned shortcomings.

SUMMARY OF THE INVENTION

In one embodiment thereof, a sliding mechanism for use in a portable electronic device is provided. The sliding mechanism includes a first plate, a second plate, a plurality of limiting structures, and a linkage module. The second plate is slidably connected to the first plate. The limiting structure is secured on/to the first plate in order to limit a position of the second plate with respect to the first plate. The linkage module is configured with a first and second gap and is positioned between the first plate and the second plate and connects the first plate and the second plate. The linkage module includes an elastic unit. The elastic unit is able to store spring energy that can be used to drive the linkage module. The release of such energy enables the second plate to automatically slide along the first plate after the second plate is manually moved a predetermined range of length with respect to the first plate.

A portable electronic device is provided and includes a first housing, a second housing, the above sliding mechanism, and a fixing means. The second housing is slidably connected to the first housing. The sliding mechanism is configured to semi-automatically drive the sliding of second housing with respect to the first housing. The fixing means is configured to fix the first and second housings to the sliding mechanism.

Other advantages and novel features will become more apparent from the following detailed description when taken in conjunction with the accompanying drawings.

BRIEF DESCRIPTION OF THE DRAWINGS

Many aspects of the sliding mechanism and portable electronic device using the same can be better understood with reference to the following drawings. These drawings are not necessarily drawn to scale, the emphasis instead being placed upon clearly illustrating the principles of the present sliding mechanism and portable electronic device using the same. Moreover, in the drawings like reference numerals designate corresponding parts throughout the several views.

DETAILED DESCRIPTION OF PREFERRED EMBODIMENTS

The present sliding mechanism is suitable for portable electronic devices, such as mobile phone terminals, digital cameras, and so on.

Figure 1:
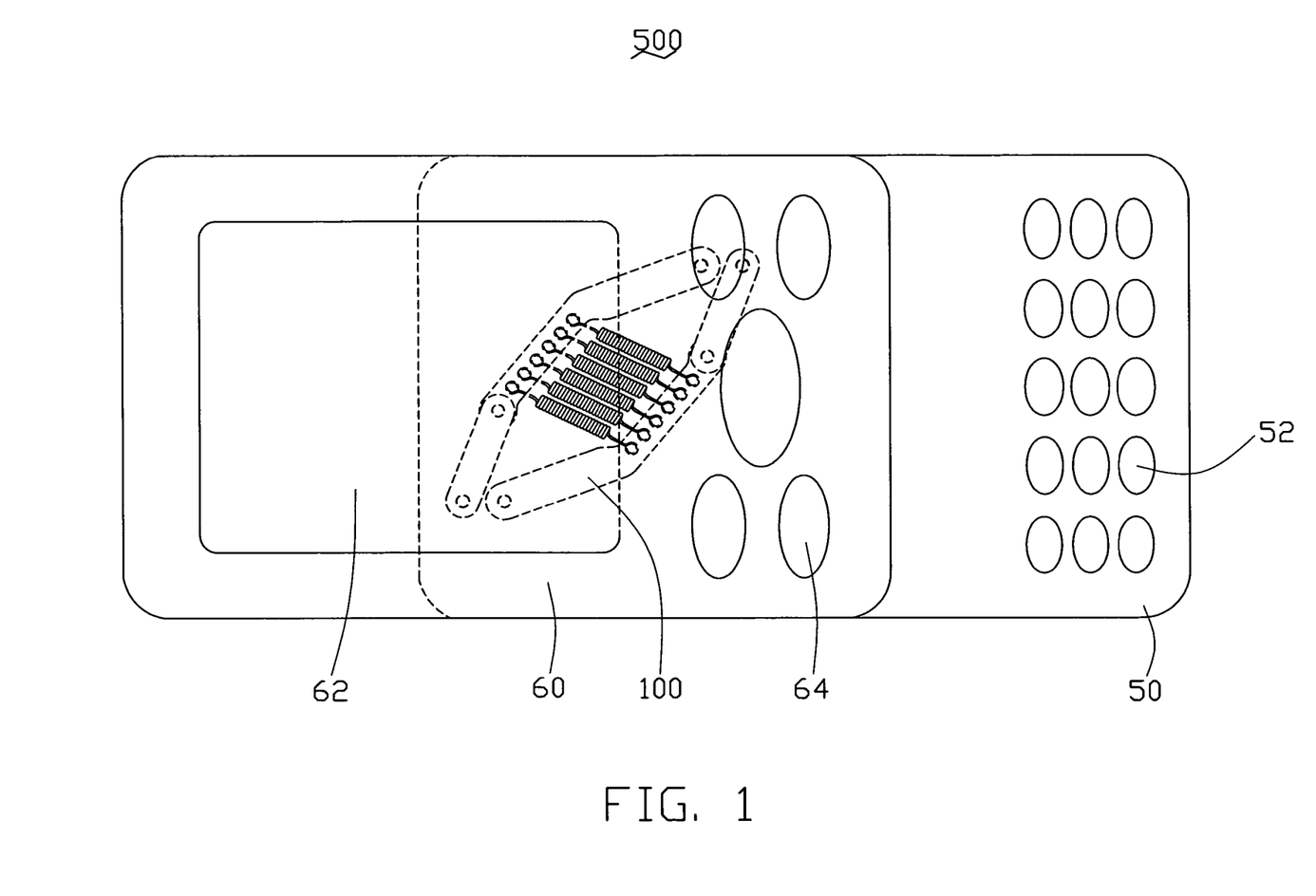
FIG. 1 is an isometric view of an opened mobile phone terminal incorporating a sliding mechanism, in accordance with a preferred embodiment.

Referring to the drawings in detail, FIG. 1 shows an exemplary preferred mobile phone terminal 500 installed with a sliding mechanism 100. The mobile phone terminal 500 includes a first housing 50 and a second housing 60. The second housing 60 is oriented face-to-face with the second housing 60 and is slidably movable with respect thereto due to the sliding mechanism 100. Advantageously, as illustrated, the first housing 50 is provided with a keypad section 52 facing towards the second housing 60, and the second housing 60 is equipped with a display unit 62 and a function key section 64 on an outside thereof. When the mobile phone terminal 500 is in a standby state, the keypad section 52 is protected within the second housing 60. Once the sliding mechanism 100 enables the second housing 60 to slide relative to the first housing 50, the keypad section 52 is exposed and is available for use.

Figure 2:
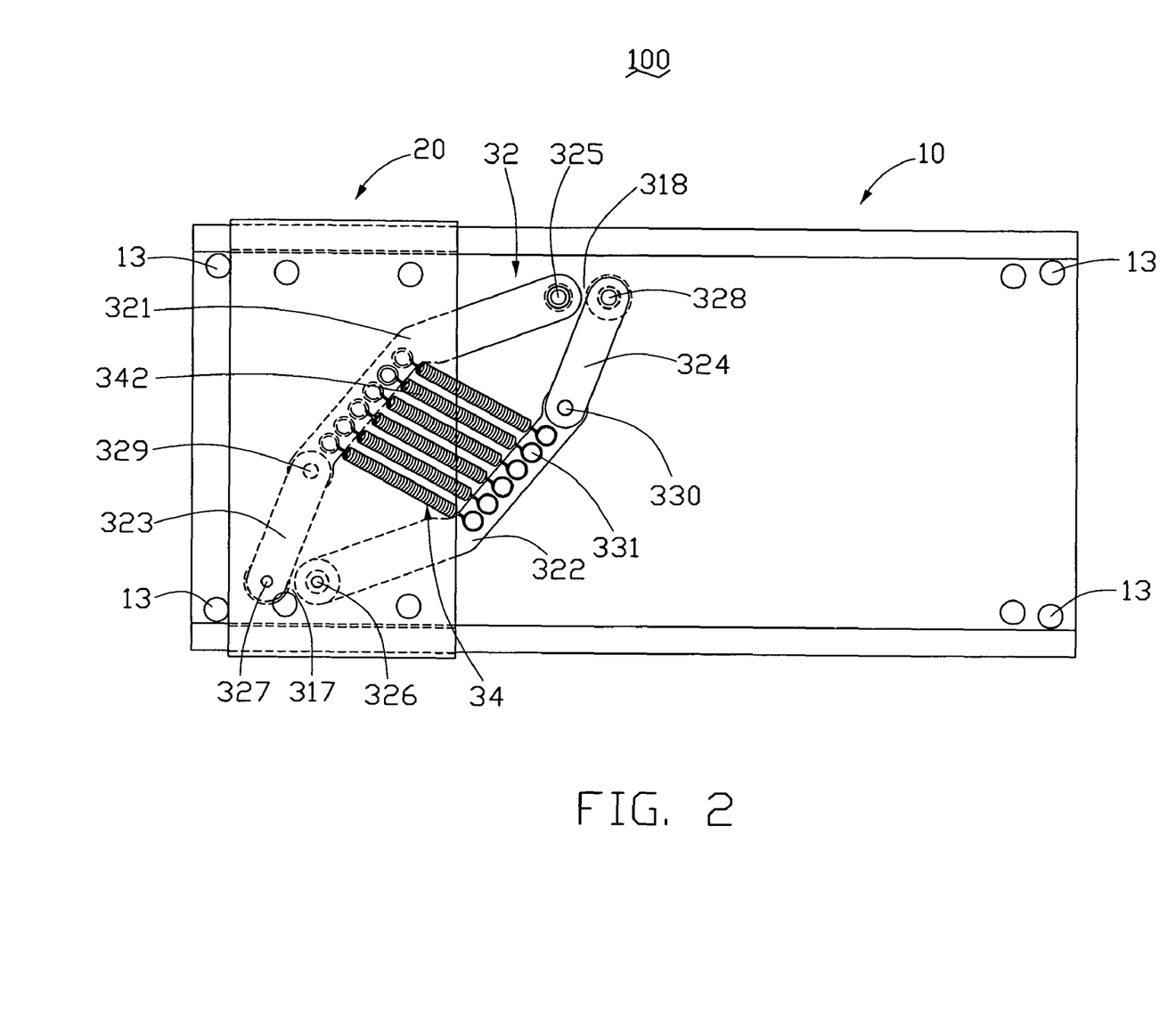
FIG. 2 is an enlarged, top view of the sliding mechanism shown in FIG. 1.
Figure 3:
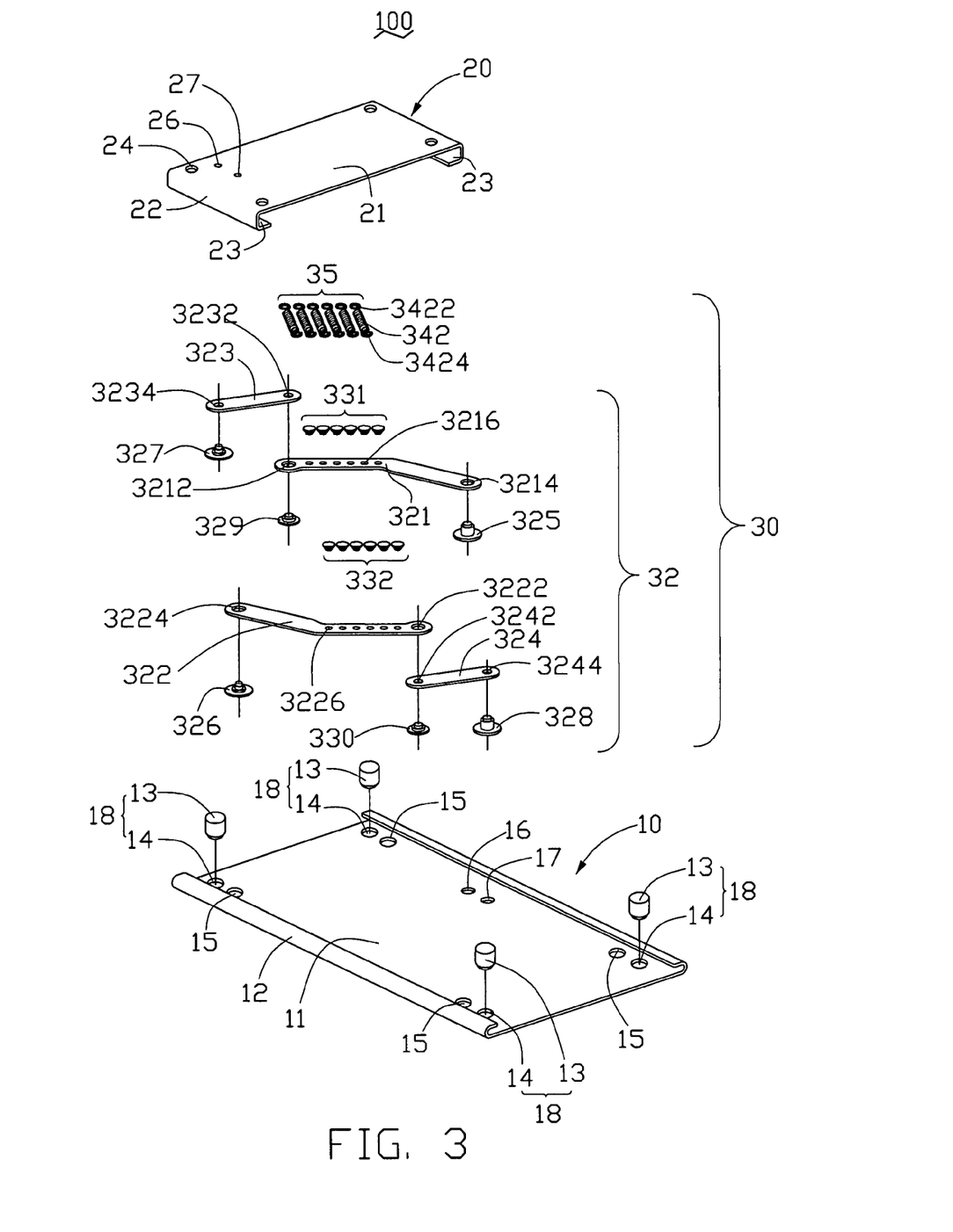
FIG. 3 is an exploded, isometric view of the sliding mechanism shown in FIG. 2.

Referring now to FIGS. 2 and 3, the sliding mechanism 100 includes a first plate 10, a second plate 20, and a linkage module 30. The linkage module 30 links the first plate 10 and the second plate 20 and, after a manual initiation, smoothly drives the second plate 20 to slide along the first plate 10. The first plate 10 is fixed to the first housing 50 of the mobile phone terminal 500, and the second plate 20 is attached to the second housing 60 of the mobile phone terminal 500.

Referring to FIG. 3 in detail, the first plate 10 of the sliding mechanism 100 is generally rectangular and includes a main body 11, two guide rails 12, and four limiting portions 13. The two guide rails 12 respectively extend directly and upwardly from the two opposite, relative long sides of the main body 11. Each limiting portion 13 is preferably a cylindrical column with a thread formed upon at least one end thereof. The main body 11 has four limiting holes 14, a plurality of first fixing holes 15, a first engaging hole 16, and a second engaging hole 17 defined therethrough.

The four limiting holes 14 correspond to the four limiting portions 13 and are preferably screw holes to facilitate a threaded connection with a given limiting portion 13. Each limiting portion 13 and its corresponding limiting hole 14 cooperatively form a limiting structure 18, which limits the position (more specifically, the potential range of movement) of the second plate 20 relative to the first plate 10. Each limiting structure 18 is disposed at one end of the first plate 10. A distance between adjacent limiting portions 13, along the guide rails 12, depends upon a predetermined range of sliding length/distance of the second housing 60 of the mobile phone terminal 500 relative to the first housing 50 thereof.

The first fixing holes 15 are used to facilitate the fixing of the first plate 10 to the first housing 50 of the mobile phone terminal 500. The first fixing holes 15 are preferably four screw holes, which are respectively arranged and distributed evenly along/adjacent the two relatively long sides (three on each side, with one at each end and the third centrally positioned, per side) of the main body 11. The first engaging hole 16 and the second engaging hole 17 are defined in the middle of the main body 11 with a specified distance therebetween and are respectively positioned adjacent to a corresponding guide rail 12.

An end of a given limiting portion 13 is threadably inserted and thus attached within the limiting hole 14 corresponding thereto. It is to be understood that a given limiting portion 13 could be fixably attached, alternatively or additionally, within a given hole 14 using an adhesive or via a metallurgical connection (e.g., welding or soldering). Appropriate elements can, likewise, be attached, as needed, within other holes (e.g., 15, 16) of the sliding mechanism 100 by any of, e.g., screw-threading, adhesive, and/or metallurgical means.

The second plate 20 of the sliding mechanism 100 (shown in FIG. 3) is generally rectangular sheet-shaped. The width of a first end/side 21 thereof is approximately the same as that of a shorter end/side of the above first plate 10. Two second ends/sides 22 are respectively oriented perpendicular to the first end 21 and are opposite and parallel to one another. The two second ends/sides 22 are respectively provided with a guide groove 23. The resulting two guide grooves 23 respectively correspond to the guide rails 12 of the first plate 10. Thus, the second plate 20 can slide along the first plate 10, with the guide rails 12 engaging into the respective guide grooves 23.

The second plate 20 has a plurality of second fixing holes 24, a first positioning hole 26, and a second positioning hole 27 defined therethrough. The second fixing holes 24 are used to facilitate the fixing of the second plate 20 to the second housing 60 of the mobile phone terminal 500. The second fixing holes 24 are preferably four screw holes to permit a threaded attachment with the second plate 20. Such second fixing holes 24 are respectively arranged and distributed evenly on the four corners of the first plate 10. The first positioning hole 26 and second positioning hole 27 are respectively defined with a specified distance therebetween, and the first positioning hole 26 is located between the second positioning hole 27 and one second fixing hole 24. The first and second poisoning holes 26,27 are positioned adjacent to one guide groove 23.

The linkage module 30 includes a linking unit 32 and an elastic unit 34. The elastic unit 34 is secured within the linking unit 32 and urges the linking unit 32 to change an alignment/configuration thereof, due to the spring force that is able to be stored and released thereby.

The linking unit 32 includes a first curved connecting bar 321, a second curved connecting bar 322, a first linking board 323, a second linking board 324, a first positioning member 325, a second positioning member 326, a third positioning member 327, a fourth positioning member 328, a first connecting member 329, a second connecting member 330, a plurality of first fixing members 331, and a plurality of second fixing members 332. The first and second curved connecting bars 321, 322 and the first and second linking boards 323, 324 are preferably sheet-shaped. By such parts 321-324 being sheet-shaped, the overall thickness of the linking unit 32 can be minimized. Accordingly, it is easier to incorporate the linking unit 32, ultimately, within the body of the mobile phone terminal 500. The first curved connecting bar 321 has a substantially size and shape as that of the second curved connecting bar 322, and the first linking board 323 is essentially identical to the second linking board 324 in shape and size.

The first curved connecting bar 321 has a first connecting hole 3212 and a third engaging hole 3214 defined through two respective end portions as well as a plurality of third fixing holes 3216 defined in one end portion. The third engaging hole 3214 corresponds to the first engaging hole 16 of the first plate 10. The third fixing holes 3216 are arranged and disposed linearly along the one end portion and correspond to the first fixing member 331. A second connecting hole 3222 and a third positioning hole 3224 are defined through two respective end portions of the second curved connecting bar 322. One end portion of the second curved connecting bar 322 further has a plurality of fourth fixing holes 3226 formed linearly thereon. The fourth fixing holes 3226 correspond to the third fixing holes 3216 of the first connecting bar 321 and the second fixing members 332. The third positioning hole 3224 corresponds to the second positioning hole 27 of the second plate 20.

The first linking board 323 defines a third connecting hole 3232 corresponding to the first connecting hole 3212 of the first curved connecting bar 321 and defines a fourth positioning hole 3234 corresponding to the first positioning hole 26 of the second plate 20. The second linking board 324 has a fourth connecting hole 3242 and a fourth engaging hole 3244 formed therethrough. The fourth connecting hole 3242 corresponds to the second connecting hole 3242 of the second connecting bar 322. The fourth engaging hole 3244 corresponds to the second engaging hole 17 of the first plate 10.

The first and fourth positioning members 325, 328 are configured (i.e. structured and arranged) to permit rotatable positioning of the first connecting bars 321 and the second linking board 324 to the first plate 10. The second and third positioning members 326, 327 are configured to allow rotatable positioning of the second connecting bars 322 and the first linking board 323 to the second plate 20. The first and second connecting members 329, 330 function to integrate the first and second connecting bars 321, 322 and the first and second linking boards 323, 324, as a whole, and further provide the entirety of the linking unit 32 with a rotational freedom. The integrated linking unit 32 approximates a selectably collapsible hexagon with a distinct (i.e., due to the spacing therebetween) pair of opposed hinged sections. The positioning members 325-328 and the first and second connecting members 329, 330 all configured to act as connective pivot/hinge pins to facilitate the collapsible/expandable nature of the linking unit 32.

The elastic unit 34 is a unit comprising a number of elastic members 342 corresponding to the third and fourth fixing holes 3216, 3226. The elastic members 342 are preferably coil springs, each of which is provided with a first latch hook 3422 and a second latch hook 3424 on the respective ends thereof. The first and second latch hooks 3422, 3424 are configured and dimensioned to hook with the third and fourth fixing holes 3216, 3226, respectively. Accordingly, the elastic members 342 fixedly extend from one hinged section to the second opposed hinged section of the linking unit 32. The elastic members 342, mounted in such a fashion, are able to act a source of releasable spring energy that can be used to semi-automatically open or close the sliding mechanism 100, as desired. It is to be understood, however, that the elastic members 342 could, instead, take the form of another spring type or could be elastomeric elements.

Referring also to FIG. 2, in assembly of the sliding mechanism 100, the first linking board 323 is rotably coupled to the first connecting bar 321. This coupling is achieved by means of the first connecting member 329 engaging with the first connecting hole 3212 of the first connecting bar 321 and the third connecting hole 3232 of the first linking board 323. Then, the first connecting bar 321 is rotably attached to the first plate 10, via the first positioning member 325 engaging into the first engaging hole 16 of the first plate 10 and the third engaging hole 3214 of the first connecting bar 321.

The second linking board 324 is rotably secured to the second connecting bar 322, via the second connecting member 330 engaging with the fourth connecting hole 3242 of the second linking board 324 and the second connecting hole 3222 of the second connecting bar 322. The second linking board 324 is further positioned and rotatably connected to the first plate 10 by the fourth positioning member 328 engaging in/with the second engaging hole 17 of the first plate 10 and the fourth engaging hole 3244 of the second linking board 324. Thus, the second linking board 324 can rotate around the fourth positioning member 328 and, yet, cannot interfere with the movement of first connecting bar 321, due to a first gap 317 defined between the second linking board 324 and the first connecting bar 321.

Next, each elastic member 342 of the elastic unit 34 links the first and second connecting bars 321, 322. In this case, the first fixing members 331 respectively engage into the third fixing holes 3216 and the first latch hooks 3422. Similarly, the second fixing members 332 respectively engage into the fourth fixing holes 3226 and the second latch hooks 3424.

After that, the second plate 20 of the sliding mechanism 100 engages with the first plate 10. In particular, the two guide rails 12 of the first plate 10 slidably fit into the two respective guide grooves 23. The second plate 20 is further moved and positioned. Specifically, the first positioning hole 26 thereof aligns with the fourth positioning hole 3234 of the second linking board 324, and the second positioning hole 27 conforms with the third positioning hole 3224 of the second connecting bar 322. Thus, the linking unit 32 and the elastic unit 34 are located between the first plate 10 and the second plate 20.

Then, the second positioning member 326 is inserted into and through the second positioning hole 27 and the third positioning hole 3224. The third positioning member 327 is inserted through the first positioning hole 26 and the fourth positioning hole 3234. As such, the first linking board 323 can rotate/pivot freely around the third positioning member 327 and, yet, cannot interfere with the second connecting bar 322, due to a second gap 318 defined between the first linking board 323 and the second connecting bar 322. The second connecting bar 322 is rotably coupled with the second plate 20 and cannot interact with the first linking board 323 because of the second gap 318. The limiting portions 13 are respectively threadedly secured into the limiting holes 14. Thus, the sliding mechanism 100 is totally assembled, with the elastic unit 34 between the first and second connecting bars 321, 322 and the limiting portions 13 preventing the second plate 20 from sliding off the first plate 10.

When the first and second housings 50, 60 of the mobile phone terminal 500 being firmly secured with the first and second plates 10, 20 in a certain original position, the mobile phone terminal 500 may be selectably opened or closed. Referring now to FIG. 1 (showing an original position of the mobile phone terminal 500), in this embodiment, the mobile phone terminal 500 is opened, with the second housing 60 displaced to the first housing 50 and the keypad section 52 thereby being exposed.

Figure 4:
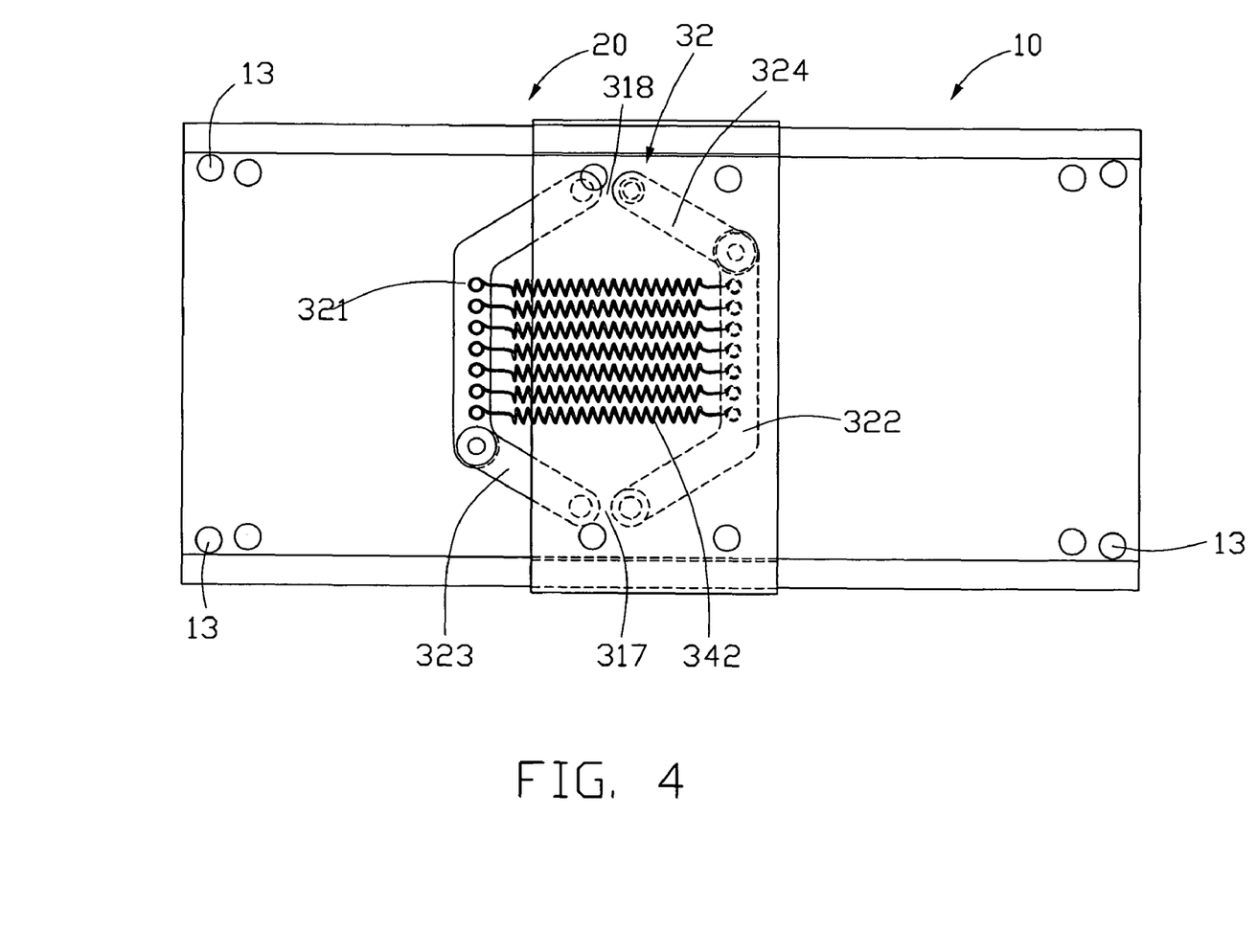
FIG. 4 is a top view of the sliding mechanism shown in FIG. 2, an elastic unit being provided with a maximized elastic force and thereby in an open state.
Figure 5:
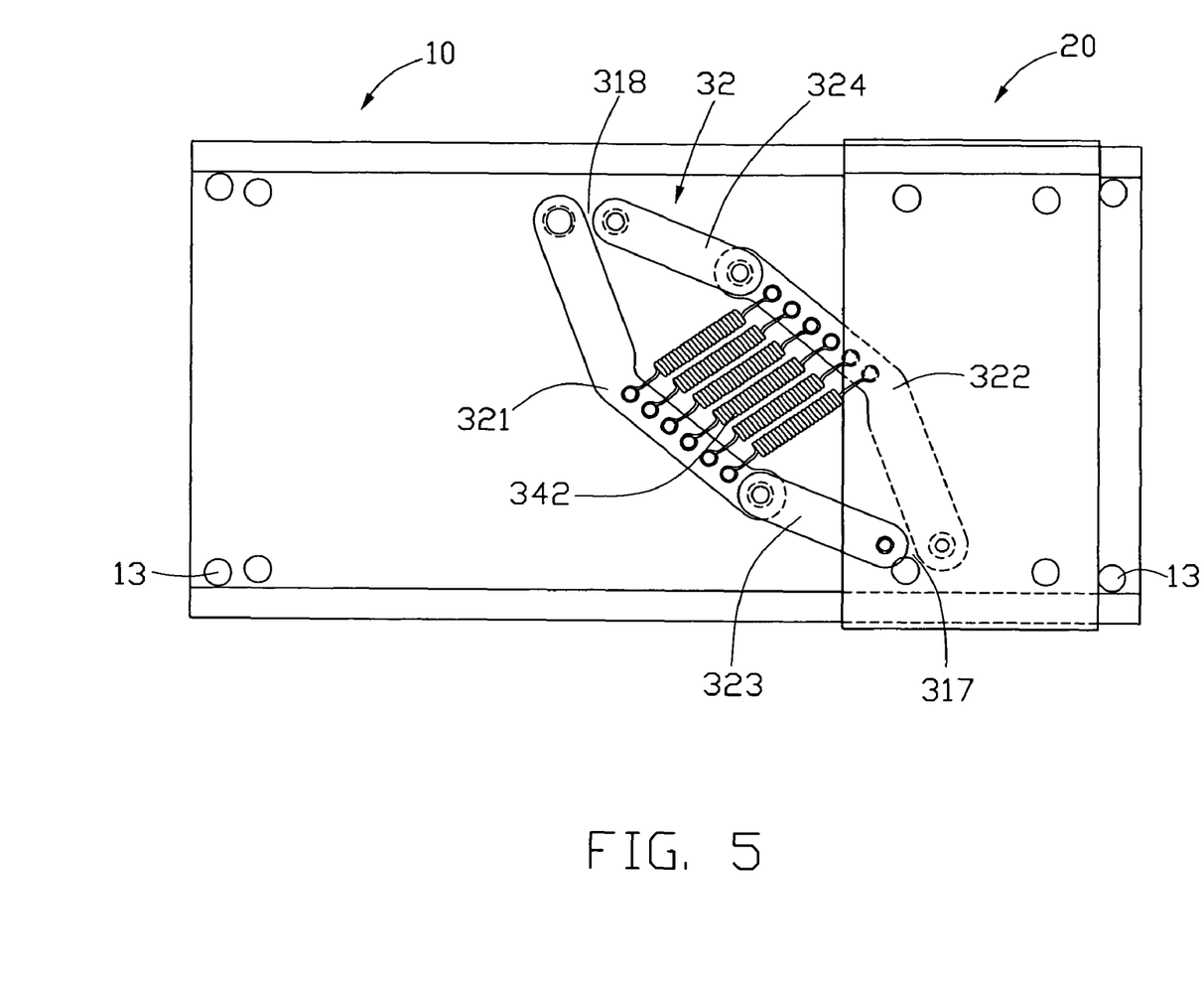
FIG. 5 is a top view of the sliding mechanism shown in FIG. 2, in a closed state.

In use, FIG. 2 shows an original state of the sliding mechanism 100, FIG. 4 shows a critical state thereof in which the elastic unit 34 is provided with maximized elastic/biasing force, and FIG. 5 shows a final state thereof corresponding to a closed mobile phone 500. Referring to FIG. 2, the mobile phone terminal 500 is at an opened state. At such time, the elastic unit 34 of the sling-type mechanism is biased to enable the first linking board 323 to be essentially parallel to the second linking board 324.

Referring to FIG. 4, a line A is illustrated which indicates an operating direction of the sliding mechanism 100. When the second plate 20 of sliding mechanism 100 is urged along the line A by an external force (e.g., being manually pushed by a user), the second plate 20 is moved along the first plate 10, with the guide rails 12 of the first plate 10 sliding with respect to the first plate 10. At this time, the external force overcomes the biasing force of the elastic unit 34 and enables the first and connecting bars 321,322 to rotate in a counter-clockwise direction. As the second plate 20 is moved further away from the first plate 10, a stronger biasing force of the elastic unit 34 is provided. When the second plate 20 reaches a specific position (best shown in FIG. 4) at which the linking unit 32 approximates the shape of a regular hexagon, the spring/biasing force of the elastic unit 34 is at its greatest. At the position of FIG. 4, each elastic member 342 of the elastic unit 34 is located in parallel with one another and with the guide rails 12.

Once the second plate 20 moves a further distance, the external force is not needed, and the biasing force of the elastic unit 34 can urge the second plate 20 to move freely/automatically along the first plate 10. As such, spring energy of the elastic unit 34 is released to drive the second housing 60 of the mobile phone terminal 500 to slide freely towards the first housing 50 thereof, and the mobile phone terminal 500 can be closed automatically. During this process, the first and connecting bars are further rotated in the counterclockwise direction. Referring to FIG. 5, the sliding mechanism is at the final state, whereby the elastic unit 34 is restored to original state, and the second plate 20 is moved from its original position, delimited by one limiting portion 13 (best shown in FIG. 2), to another position blocked by the other limiting portion 13 (best shown in FIG. 5). In this case, the mobile phone terminal 500 is in a closed state with the keypad section 52 thereof being enclosed by the second housing 60.

When there is need to reopen the mobile phone terminal 500, an external force is provided in a new direction opposite to the line A to drive the second plate 20 to slide back along the first plate 10. During this process, the external force overcomes the increasing biasing force of the expanded elastic unit 34 to enable the first and second connecting bars 321,322 to rerotate in a clockwise direction. When the biasing force of the elastic unit 34 reaches its maximized extent, the external force is removed, and the spring energy of the elastic unit 34 is released to further automatically rotate the first and second connecting bars 321, 322. Thus, the second plate 20 slides with respect to the first plate 10 until the second plate 20 is blocked and stopped by the limiting portions 13 again. As such, referring to FIG. 2, the sliding mechanism 100 is restored to an original state, and the mobile phone terminal 500 is reopened with the keypad section 52 thereof being exposed again.

The sliding mechanism 100 and the portable electronic device (e.g., mobile phone terminal 500) using the same are configured and adapted to facilitate a semi-automatic sliding opening/closure of the second housing 60 thereof. That is, the sliding mechanism 100 allows a user to control the opening and closure operation with more ease and convenience. In particular, the linking unit 32 is able to store energy in the elastic unit 34, energy that effectively can be used to facilitate semi-automatic opening and closing of the present sliding mechanism 100. Also, the hinged/pivoted construction of the linking unit 32 (i.e., approximating a collapsible hexagon) promotes smooth and steady operation of the present sliding mechanism 100.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding mechanism, comprising:
a first plate comprising a main body and two opposite guide rails, the two guide rails extending along the main body;
a second plate comprising two guide grooves and slidably connected to the first plate by a slidable engagement of the guide rails in the guide grooves;
a plurality of limiting structures secured on the first plate, each limiting structure being configured for limiting movement of the second plate relative to the first plate; and
a linkage module positioned between the first plate and the second plate and connecting the first plate and the second plate, the linkage module including an elastic unit and a linking unit, the elastic unit comprising a plurality of parallel coil springs, each coil spring having two ends, each end secured to an opposite portion of the linking unit, the linking unit defining a hexagon enclosing the plurality of coil springs and collapsible with the sliding of the first plate relative to the second plate, simultaneously driving the coil springs and the elastic unit to longitudinally extend or retract, the retraction beginning after the maximum extension automatically driving the second plate to slide along the first plate after the second plate is manually moved a predetermined length relative to the first plate.

2. The sliding mechanism as claimed in claim 1, wherein the linking unit comprises a first linking board, a second linking board, a first connecting bar, and a second connecting bar, the first linking board rotably connects the first connecting bar and the second plate, the second linking rotably connects the second connecting bar and the first plate, the first connecting bar rotably connects the first plate, the second connecting bar rotably connects the second plate, a first gap is defined between the second linking board and the first connecting bar, and a second gap is defined between the first linking board and the second connecting bar.

3. The sliding mechanism as claimed in claim 2, wherein the first gap is configured to enable the second linking board and the first connecting bar not to interact with each other, and the second gap is configured to enable the first linking board and the second connecting bar not to interact with each other.

4. The sliding mechanism as claimed in claim 3, wherein each coil spring includes first and second latch hooks formed thereon at two respective ends, the first and second connecting bars include a plurality of third and fourth fixing holes, respectively, formed therethrough corresponding to the first and second latch hooks respectively, and the linkage module further comprises a plurality of first fixing members corresponding to the third fixing holes and a plurality of second fixing members corresponding to the fourth fixing holes.

5. The sliding mechanism as claimed in claim 2, wherein the linking unit further comprises a first positioning member, a second positioning member, a third positioning member, a fourth positioning member, a first connecting member, and a second connecting member, the first positioning member is configured to rotably couple the first connecting bar to the first plate, the second positioning member is configured to rotably couple the second connecting bar to the second plate, the third positioning member is configured to rotably couple the first linking board to the second plate, the fourth positioning member is configured to rotably couple the second linking board to the first plate, the first connecting member is configured to rotably couple the first linking board to the first connecting bar, and the second connecting member is configured to rotably couple the second linking board to the second connecting bar.

6. The sliding mechanism as claimed in claim 5, wherein the first connecting bar includes a first connecting hole defined therethrough, the first linking board has a third connecting hole defined therethrough, and the first connecting hole corresponds to the third connecting hole and the first connecting member.

7. The sliding mechanism as claimed in claim 1, wherein each limiting structure comprises a limiting portion, the first plate comprises a main body, and the limiting portions are respectively attached to a one of two opposite ends of the main body.

8. The sliding mechanism as claimed in claim 7, wherein the limiting portions are threadedly connected with the main body.

9. A portable electronic device, comprising:
a first housing;
a second housing slidably connecting to the first housing; and
a sliding mechanism configured to drive the second housing to slide relative to the first housing, the sliding mechanism including:
a first plate comprising a main body and two opposite guide rails, the two guide rails extend along the main body, the first plate fixed to the first housing;
a second plate comprising two guide grooves and slidably connected to the first plate by a slidable engagement of the guide rails in the guide grooves, the second plate fixed to the second housing;
a plurality of limiting structures secured on the first plate, each limiting structure being configured for limiting movement of the second plate relative to the first plate; and
a linkage module positioned between the first plate and the second plate and connecting the first plate and the second plate, the linkage module including an elastic unit and a linking unit, the elastic unit comprising a plurality of parallel coil springs, each coil spring having two ends, each end secured to an opposite portion of the linking unit, the linking unit defining a hexagon enclosing the plurality of coil springs, and collapsible with the sliding of the first plate relative to the second plate, simultaneously driving the coil springs and the elastic unit to longitudinally extend or retract, the retraction beginning after the maximum extension automatically driving the second plate to slide along the first plate after the second plate is manually moved a predetermined length relative to the first plate.

10. The portable electronic device as claimed in claim 9, wherein the linking unit comprises a first linking board, a second linking board, a first connecting bar, and a second connecting bar, the first linking board rotably connects the first connecting bar and the second plate, the second linking rotably connects the second connecting bar and the first plate, the first connecting bar rotably connects the first plate, the second connecting bar rotably connects the second plate, a first gap is defined between the second linking board and the first connecting bar, and a second gap is defined between the first linking board and the second connecting bar.

11. The portable electronic device as claimed in claim 10, wherein the first gap is configured to enable the second linking board and the first connecting bar not to interact with each other, and the second gap is configured to enable the first linking board and the second connecting bar not to interact with each other.

12. The portable electronic device as claimed in claim 9, wherein each limiting structure comprises a limiting portion, the first plate comprises a main body, and the limiting portions are respectively attached to a one of two opposite ends of the main body.

* * * * *